US009975986B2

(12) United States Patent
Ishihara et al.

(10) Patent No.: US 9,975,986 B2
(45) Date of Patent: May 22, 2018

(54) COMPOSITION, ADHESIVE AGENT, ADHESIVE SHEET, AND LAMINATE

(71) Applicant: BRIDGESTONE CORPORATION, Tokyo (JP)

(72) Inventors: Takenobu Ishihara, Kodaira (JP); Shuuyou Akama, Kodaira (JP); Atsushi Hara, Kodaira (JP); Akiko Gondoh, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 11 days.

(21) Appl. No.: 14/888,495

(22) PCT Filed: May 13, 2014

(86) PCT No.: PCT/JP2014/062748
§ 371 (c)(1),
(2) Date: Nov. 2, 2015

(87) PCT Pub. No.: WO2014/188914
PCT Pub. Date: Nov. 27, 2014

(65) Prior Publication Data
US 2016/0168309 A1 Jun. 16, 2016

(30) Foreign Application Priority Data

May 24, 2013 (JP) ................. 2013-110040

(51) Int. Cl.
| C08G 18/38 | (2006.01) |
| C08G 18/75 | (2006.01) |
| C09J 175/06 | (2006.01) |
| B32B 25/14 | (2006.01) |
| B32B 7/12 | (2006.01) |
| B32B 15/06 | (2006.01) |
| B32B 25/12 | (2006.01) |
| C08G 18/73 | (2006.01) |
| C09J 7/00 | (2018.01) |
| B32B 25/08 | (2006.01) |
| C08C 19/20 | (2006.01) |
| C08G 18/78 | (2006.01) |
| C08G 18/79 | (2006.01) |
| C08G 18/80 | (2006.01) |
| C08G 18/20 | (2006.01) |
| C09J 175/04 | (2006.01) |

(52) U.S. Cl.
CPC ............ *C08G 18/3876* (2013.01); *B32B 7/12* (2013.01); *B32B 15/06* (2013.01); *B32B 25/08* (2013.01); *B32B 25/12* (2013.01); *B32B 25/14* (2013.01); *C08C 19/20* (2013.01); *C08G 18/2063* (2013.01); *C08G 18/73* (2013.01); *C08G 18/755* (2013.01); *C08G 18/7831* (2013.01); *C08G 18/7837* (2013.01); *C08G 18/792* (2013.01); *C08G 18/794* (2013.01); *C08G 18/8025* (2013.01); *C08G 18/8029* (2013.01); *C09J 7/00* (2013.01); *C09J 175/04* (2013.01); *C09J 175/06* (2013.01); *B32B 2255/10* (2013.01); *B32B 2255/26* (2013.01); *C09J 2475/00* (2013.01)

(58) Field of Classification Search
CPC ...................... C08G 18/2036; C08G 18/3876; C08G 18/73; C08G 18/755; C08G 18/7831; C08G 18/7837; C08G 18/792; C08G 18/794; C08G 18/8025; C08G 18/8029; C09J 175/04; C09J 175/06; C09J 2475/00; C09J 7/00; C08C 19/20; B32B 15/06; B32B 2255/10; B32B 2255/26; B32B 25/08; B32B 25/12; B32B 25/14; B32B 7/12
USPC ......... 428/423.9, 424.7, 424.8, 425.8, 425.9; 528/60, 65, 66
See application file for complete search history.

(56) References Cited

U.S. PATENT DOCUMENTS

| 3,676,283 | A | * | 7/1972 | Kehr et al. ............. B32B 27/00 |
| | | | | 156/275.5 |
| 3,806,486 | A | | 4/1974 | Endriss et al. |
| 5,736,609 | A | * | 4/1998 | Irizato ............... C08G 18/3876 |
| | | | | 359/642 |
| 5,908,876 | A | | 6/1999 | Fujii et al. |

(Continued)

FOREIGN PATENT DOCUMENTS

| EP | 2944462 A1 | 11/2015 |
| JP | 57-80428 A | 5/1982 |

(Continued)

OTHER PUBLICATIONS

International Search Report of PCT/JP2014/062748 dated Aug. 12, 2014 [PCT/ISA/210] English Translation.

(Continued)

*Primary Examiner* — Thao T Tran
(74) *Attorney, Agent, or Firm* — Sughrue Mion, PLLC

(57) ABSTRACT

The present invention provides a composition obtained by blending a polythiol compound (A), an isocyanate group-containing compound (B) and a radical generator (C), wherein the polythiol compound (A) is at least one compound selected from an aliphatic polythiol and an aromatic polythiol each of which has a thiol group binding to a primary carbon atom and may contain a hetero atom. The present invention thus provides a composition capable of bonding a rubber member, particularly a vulcanized rubber member, strongly, readily and within a short time, an adhesive and an adhesive sheet using the composition, and a laminate produced by bonding a rubber layer using at least one of these adhesive composition and adhesive sheet.

11 Claims, No Drawings

(56) References Cited

U.S. PATENT DOCUMENTS

| | | | | |
|---|---|---|---|---|
| 5,955,206 | A * | 9/1999 | Okazaki | C08G 18/3876 428/542.8 |
| 2002/0107353 | A1 * | 8/2002 | Kitahara | C07C 323/25 528/73 |
| 2004/0091716 | A1 * | 5/2004 | Van Den Berg | B05D 7/16 428/422.8 |
| 2008/0013042 | A1 * | 1/2008 | Habassi | C08F 220/26 351/159.01 |
| 2009/0124762 | A1 * | 5/2009 | Brown | C08G 18/18 525/418 |
| 2009/0278084 | A1 * | 11/2009 | Messana | C07C 229/60 252/182.17 |
| 2009/0298962 | A1 * | 12/2009 | Studer | C08G 18/42 522/46 |
| 2010/0236707 | A1 * | 9/2010 | Studer | C08G 18/10 156/275.5 |
| 2016/0280840 | A1 * | 9/2016 | Murakami | C08G 18/8133 |

FOREIGN PATENT DOCUMENTS

| | | |
|---|---|---|
| JP | 01-96208 A | 4/1989 |
| JP | 05-287050 A | 11/1993 |
| JP | 09-12663 A | 1/1997 |
| JP | 10-114825 A | 5/1998 |
| JP | 10-139901 A | 5/1998 |
| JP | 10-298260 A | 11/1998 |
| JP | 11-193355 A | 7/1999 |
| JP | 11-349658 A | 12/1999 |
| JP | 2009-543913 A | 12/2009 |
| WO | 2014/09217 A1 | 7/2014 |

OTHER PUBLICATIONS

Communication dated Mar. 9, 2016, from the European Patent Office in counterpart application No. 14801807.0.

* cited by examiner

COMPOSITION, ADHESIVE AGENT, ADHESIVE SHEET, AND LAMINATE

CROSS REFERENCE TO RELATED APPLICATIONS

This application is a National Stage of International Application No. PCT/JP2014/062748, filed May 13, 2014, claiming priority based on Japanese Patent Application No. 2013-110040, filed May 24, 2013, the contents of all of which are incorporated herein by reference in their entirety.

TECHNICAL FIELD

The present invention relates to a composition, an adhesive, an adhesive sheet and a laminate, and precisely relates to a composition, an adhesive and an adhesive sheet suitable for bonding of rubber members and to a laminate produced by bonding rubber layers using at least one of these composition, adhesive and adhesive sheet.

BACKGROUND ART

Heretofore, a material having a good adhesion force to a vulcanized rubber member is desired, but there is not known any material capable of realizing a sufficient adhesion force. As a method of bonding a vulcanized rubber member, for example, PTL 1 discloses a technique of surface-treating a vulcanized rubber member and bonding another member to the treated surface via an adhesive therebetween.

CITATION LIST

Patent Literature

PTL 1: JP-A 10-139901

SUMMARY OF INVENTION

Technical Problem

However, in the method described in PTL 1, vulcanized rubber is subjected to surface treatment, and then bonded to another material via an adhesive, that is, the method has some problems in labor needed for the surface treatment and time taken for curing the adhesive. Furthermore, the method has a problem that the adhesion force thereof is insufficient since a polyurethane adhesive is used.

The present invention relates to a composition capable of bonding a rubber member, particularly a vulcanized rubber member, strongly, readily and within a short time, to an adhesive and an adhesive sheet using the composition, and to a laminate produced by bonding a rubber layer using at least one of these adhesive composition and adhesive sheet.

Solution to Problem

The present inventors have found that the above-mentioned problems can be solved by blending a polythiol compound (A) having a specific structure, an isocyanate group-containing compound (B) and a radical generator (C), and thereby have completed the present invention.

Specifically, the present invention relates to the following [1] to [11].

[1] A composition obtained by blending a polythiol compound (A), an isocyanate group-containing compound (B) and a radical generator (C), wherein: the polythiol compound (A) is at least one compound selected from an aliphatic polythiol and an aromatic polythiol each of which has a thiol group binding to a primary carbon atom and may contain a hetero atom.

[2] The composition according to [1], wherein the polythiol compound (A) is an aliphatic polythiol.

[3] The composition according to [2], wherein the aliphatic polythiol is an acyclic aliphatic compound optionally containing a hetero atom.

[4] The composition according to [2], wherein the aliphatic polythiol is a compound having an isocyanurate ring structure.

[5] The composition according to [3], wherein the aliphatic polythiol is at least one compound selected from a (tetrafunctional) compound having four of the above-mentioned thiol groups in the molecule and a (hexafunctional) compound having six of the above-mentioned thiol groups in the molecule.

[6] The composition according to [4], wherein the aliphatic polythiol is a (trifunctional) compound having three of the above-mentioned thiol groups in the molecule.

[7] The composition according to any of any of [1] to [6], wherein the ratio of the total molar number of the isocyanate group contained in the isocyanate-containing compound (B) to the total molar number of the thiol group contained in the polythiol compound (A) (isocyanate group/thiol group) is from 0.2 to 0.78.

[8] The composition according to any of [1] to [7], wherein the ratio of the total molar number of the radical generator (C) to the total molar number of the thiol group contained in the polythiol compound (A) (radical generator (C)/thiol group) is 0.025 or more.

[9] An adhesive containing the composition of any of [1] to [8].

[10] An adhesive sheet using the composition of any of [1] to [8].

[11] A laminate including two or more layers bonded to each other, wherein:
at least one layer is a rubber layer, and
the at least one rubber layer is adhered to the adjacent layer via the adhesive of [9] or the adhesive sheet of [10].

Advantageous Effects of Invention

According to the present invention, there can be provided a composition capable of bonding a rubber member, particularly a vulcanized rubber member, strongly, readily and within a short time, an adhesive and an adhesive sheet using the composition, and a laminate produced by bonding a rubber layer using at least one of these adhesive composition and adhesive sheet.

DESCRIPTION OF EMBODIMENTS

[Composition]

The composition of the present invention is obtained by blending a polythiol compound (A), an isocyanate group-containing compound (B) and a radical generator (C), wherein the polythiol compound (A) is at least one compound selected from an aliphatic polythiol and an aromatic polythiol each of which has a thiol group binding to a primary carbon atom and may contain a hetero atom.

The composition of the present invention can strongly adhere not only to an unvulcanized rubber but also even to a vulcanized rubber, even further within a short time. The reason could be presumed as follows.

First, it is considered that a part of the polythiol compound (A) and the isocyanate group-containing compound (B) could undergo urethanation reaction, and the composition could be thereby firmly cured. In addition, it is also considered that the other part of the polythiol compound (A) would react with the radical generator (C) to give a thiyl radical, and the thiyl radical would react with the carbon-carbon double bond existing in rubber. It is considered that, through such thiol-ene reaction, the composition can chemically bond to rubber and therefore the composition can strongly adhere to the rubber. In particular, not only unvulcanized rubber but also vulcanized rubber has a carbon-carbon double bond, and therefore it is considered that the composition of the present invention can strongly adhere to rubber, especially to vulcanized rubber.

It is also considered that, through the hydrogen-drawing reaction from the carbon-carbon bond main chain existing in rubber, the sulfur atom of the thiol group of the polythiol compound (A) and the carbon atom of the carbon-carbon bond could chemically bond. Accordingly, rubber in the present invention may not always have a carbon-carbon double bond therein.

In this description, the polythiol compound (A), the isocyanate group-containing compound (B), the radical generator (C), the urethanation catalyst (D) and the surface conditioner (E) may be referred to as a component (A), a component (B), a component (C), a component (D) and a component (E), respectively.

<Polythiol Compound (A)>

In the present invention, the polythiol compound (A) is a compound having two or more thiol groups in one molecule. Not specifically limited, the polythiol compound (A) preferably has from 2 to 6 thiol groups in one molecule, from the viewpoint of improving the adhesiveness.

The polythiol compound includes a compound in which the thiol group binds to a primary carbon atom, a compound in which the thiol group binds to a secondary carbon atoms, a compound in which the thiol group binds to a tertiary carbon atom, a compound in which the group binds to any other element, etc., but in the present invention, it has been found that, by using a compound in which the thiol group binds to a primary carbon atom as the polythiol compound (A), the curing time of the composition through urethanation with the isocyanate group-containing compound (B) to be mentioned below can be shortened. In addition, at the same time, it has also been found that, by using the compound in which the thiol group binds to a primary carbon atom, not only the reaction between the thiyl radical formed through the reaction with the radical generator (C) to be mentioned below and the carbon-carbon double bond but also the hydrogen-drawing reaction can also be promoted, and, as a result, it has been known that, when a rubber layer is bonded to any other layer via the composition of the present invention containing the polythiol compound (A), then the composition can exhibit strong adhesive force.

The polythiol compound (A) includes an aliphatic polythiol having a thiol group binding to a primary carbon atom and optionally containing a hetero atom (hereinafter this may be referred to as "aliphatic polythiol optionally containing a hetero atom") and an aromatic polythiol having a thiol group binding to a primary carbon atom and optionally containing a hetero atom (hereinafter this may be referred to as "aromatic polythiol optionally containing a hetero atom"), and from the viewpoint of improving the adhesiveness, preferred here is the aliphatic polythiol optionally containing a hetero atom. Here, the aliphatic polythiol optionally containing a hetero atom means an aliphatic compound having two or more thiol groups each binding to a primary carbon atom in one molecule and optionally containing a hetero atom therein. The aromatic polythiol optionally containing a hetero atom means an aromatic compound having two or more thiol groups each binding to a primary carbon atom in one molecule and optionally containing a hetero atom therein.

The hetero atom is preferably at least one selected from oxygen, nitrogen, sulfur, phosphorus, halogen atom, and silicon, from the viewpoint of improving the adhesiveness. More preferred is at least one selected from oxygen, nitrogen, sulfur, phosphorus and halogen atom; and even more preferred is at least one selected from oxygen, nitrogen and sulfur.

The aliphatic polythiol optionally containing a hetero atom includes, for example, acyclic aliphatic compounds optionally containing a hetero atom, such as polythiols where the other moiety than the thiol group is an aliphatic hydrocarbon, such as alkanedithiols having from 2 to 20 carbon atoms, etc., polythiols derived from alcohol-halohydrin adducts by substituting the halogen atom therein with a thiol group, polythiols of hydrogen sulfide reaction products of polyepoxide compounds, thioglycolates obtained through esterification of a polyalcohol having from 2 to 6 hydroxyl groups in one molecule with a thioglycolic acid, mercapto-fatty acid esters obtained through esterification of a polyalcohol having from 2 to 6 hydroxyl groups in one molecule with a mercapto-fatty acid, etc.; compounds having an isocyanurate ring structure, such as thiol isocyanurate compounds obtained through reaction of an isocyanurate compound and a thiol, etc.; polysulfide group-containing thiols; thiol group-modified silicones, etc. Of those, preferred for use herein are acyclic aliphatic compounds optionally containing a hetero atom and isocyanurate ring structure-having compounds, from the viewpoint of the shortened curing time and the adhesion force of the composition containing the compound.

The polyalcohol having from 2 to 6 hydroxyl group in the molecule includes alkanediols having from 2 to 20 carbon atoms, poly(oxyalkylene) glycols, glycerol, diglycerol, trimethylolpropane, ditrimethylolpropane, pentaerythritol, dipentaerythritol, etc.

(Acyclic Aliphatic Compounds Optionally Containing Hetero Atom)

As the acyclic aliphatic compound optionally containing a hetero atom, from the viewpoint of improving the adhesiveness, more preferred are polythiols where the other moiety than the thiol group is an aliphatic hydrocarbon, polythiols derived from alcohol-halohydrin adducts by substituting the halogen atom therein with a thiol group, polythiols of hydrogen sulfide reaction products of polyepoxide compounds, thioglycolates, mercapto-fatty acid esters and thiol isocyanurate compounds, even more preferred are mercapto-fatty acid esters and thiol isocyanurate compounds, and further more preferred are mercapto-fatty acid esters. From the same viewpoint, more preferred are thiols not containing a polysulfide group and a siloxane bond.

Those having a network structure that contains a silicon atom in the molecule, such as thiol group-modified silsesquioxanes and the like are unfavorable, since the compounds of the type could hardly realize a good miscibility with the isocyanate group-containing compound (B) and uniformity and curability in urethanation are poor.

The acyclic aliphatic compound optionally containing a hetero atom for use in the present invention is preferably a (tetra to hexafunctional) compound having 4 to 6 of the above-mentioned thiol groups in the molecule, and from the viewpoint of shortening the curing time and improving the adhesiveness thereof, more preferred is at least one selected from (tetrafunctional) compounds having four of the above-mentioned thiol groups in the molecule and (hexafunctional) compounds having six of the above-mentioned thiol groups in the molecule.

—Polythiols where the Other Moiety than Thiol Group is Aliphatic Hydrocarbon—

Examples of the polythiols where the other moiety than the thiol group is an aliphatic hydrocarbon include alkanedithiols having from 2 to 20 carbon atoms.

The alkanedithiols having from 2 to 20 carbon atoms include 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,8-octanedithiol, 1,10-decanedithiol, 1,1-cyclohexanedithiol, 1,2-cyclohexanedithiol, etc.

—Thioglycolates—

The thioglycolates include 1,4-butanediol bisthioglycolate, 1,6-hexanediol bisthioglycolate, trimethylolpropane tristhioglycolate, pentaerythritol tetrakisthioglycolate, etc.

—Mercapto-fatty Acid Esters—

The mercapto-fatty acid esters are preferably mercapto-fatty acid esters having a thiol group binding to a primary carbon atom, from the viewpoint of improving the adhesiveness; and more preferred are β-mercaptopropionates of polyalcohols having from 2 to 6 hydroxyl groups in the molecule. The mercapto-fatty acid esters having a thiol group binding to a primary carbon atom are preferably those in which the number of the thiol groups in one molecule is from 4 to 6 (tetra to hexafunctional), more preferably 4 or 6, even more preferably 4, from the viewpoint of improving the adhesiveness.

The β-mercaptopropionates having a thiol group binding to a primary carbon atom are preferably tetraethylene glycol bis(3-mercaptopropionate) (EGMP-4), trimethylolpropane tris(3-mercaptopropionate) (TMMP), pentaerythritol tetrakis(3-mercaptopropionate) (PEMP), and dipentaerythritol hexakis(3-mercaptopropionate) (DPMP). Of those, preferred are PEMP and DPMP, and more preferred is PEMP.

(Compounds Having Isocyanurate Ring Structure)

The compounds having an isocyanurate ring structures are, from the viewpoint of improving the adhesion force, preferably thiol isocyanurate compounds having a thiol group binding to a primary carbon atom. As the thiol isocyanurate compounds having a thiol group binding to a primary carbon atom, preferred are compounds having from 2 to 4 thiol groups in one molecule from the viewpoint of improving the adhesiveness, and more preferred are compounds having 3 thiol groups.

The thiol isocyanurate compound having a thiol group binding to a primary carbon atom is preferably tris-[(3-mercaptopropionyloxy)-ethyl]-isocyanurate (TEMPIC).

(Thiol Group-modified Silicones)

The thiol group-modified silicones include KF-2001, KF-2004, X-22-167B (all trade names by Shin-Etsu Chemical Co., Ltd.), SMS042, SMS022 (both trade names by Gelest), PS849, PS850 (both trade names by UCT), etc.

(Aromatic Polythiols)

The aromatic polythiols include 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, etc.

The molecular weight of the polythiol compound (A) is preferably at most 3000 from the viewpoint of improving the adhesiveness, more preferably at most 2000, even more preferably at most 1000, still more preferably at most 900, further more preferably at most 800. In the case where the polythiol compound (A) is a polymer, the molecular weight is a styrene-equivalent number-average molecular weight thereof.

<Isocyanate Group-containing Compound (B)>

The isocyanate group-containing compound (B) includes aromatic, aliphatic and alicyclic diisocyanates and their modified derivatives, etc.

The aromatic, aliphatic and alicyclic diisocyanates include, for example, tolylene diisocyanate (TDI), diphenylmethane diisocyanate (MDI), xylylene diisocyanate (XDI), naphthylene diisocyanate (NDI), phenylene diisocyanate (PPDI), m-tetramethylxylylene diisocyanate (TMXDI), methylcyclohexane diisocyanate (hydrogenated TDI), dicyclohexylmethane diisocyanate (hydrogenated MDI), cyclohexane diisocyanate (hydrogenated PPDI), bis(isocyanatomethyl)cyclohexane (hydrogenated XDI), norbornene diisocyanate (NBDI), isophorone diisocyanate (IPDI), hexamethylene diisocyanate (HDI), butane diisocyanate, 2,2,4-trimethylhexamethylene diisocyanate, 2,4,4-trimethylhexamethylene diisocyanate, etc.

In the case where the polythiol compound (A) to be blended is a mercapto-fatty acid ester or a thiol isocyanurate compound, the isocyanate group-containing compound (B) to be blended is preferably one or more of hexamethylene diisocyanate (HDI), isophorone diisocyanate (IPDI), tolylene diisocyanate (TDI), xylylene diisocyanate (XDI), and diphenylmethane diisocyanate (MDI). Of those, more preferred are one or more of hexamethylene diisocyanate (HDI), isophorone diisocyanate (IPDI), xylylene diisocyanate (XDI), bis(isocyanatomethyl)cyclohexane (hydrogenated XDI) and tolylene diisocyanate (TDI), and even more preferred are one or more of hexamethylene diisocyanate (HDI) and isophorone diisocyanate (IPDI).

The modified derivatives of aromatic, aliphatic or alicyclic diisocyanates include TMP (trimethylolpropane) adduct-type modified derivatives to be obtained through reaction of a trimethylolpropane and an isocyanate, isocyanurate-type modified derivatives to be obtained through trimerization of an isocyanate, a burette-type modified derivatives to be obtained through reaction of a urea and an isocyanate, an allophanate-type modified derivatives to be obtained through reaction of a urethane and an isocyanate, prepolymers to be obtained through reaction with a polyol, etc., and any of these may be suitably used here.

As the TMP adduct-type modified derivatives, the isocyanurate-type modified derivatives, the burette-type modified derivatives and the allophanate-type modified derivatives, the following are preferred from the viewpoint of improving the adhesiveness.

Specifically, as the TMP adduct-type modified derivatives, preferred are TMP adduct-type modified derivatives to be obtained through reaction of TMP and TDI, TMP adduct-type modified derivatives to be obtained through reaction of TMP and XDI, TMP adduct-type modified derivatives to be obtained through reaction of TMP and hydrogenated XDI, TMP adduct-type modified derivatives to be obtained through reaction of TMP and IPDI, TMP adduct-type modified derivatives to be obtained through reaction of TMP and HDI, and TMP adduct-type modified derivatives to be obtained through reaction of TMP and MDI.

As the isocyanurate-type modified derivatives, preferred are isocyanurate-type modified derivatives to be obtained through trimerization of HDI, isocyanurate-type modified derivatives to be obtained through trimerization of IPDI, isocyanurate-type modified derivatives to be obtained through trimerization of TDI, and isocyanurate-type modified derivatives to be obtained through trimerization of hydrogenated XDI, and more preferred are at least one or more of isocyanurate-type modified derivatives to be obtained through trimerization of HDI, isocyanurate-type modified derivatives to be obtained through trimerization of IPDI, and isocyanurate-type modified derivatives to be obtained through trimerization of hydrogenated XDI.

As the burette-type modified derivatives, preferred are burette-type modified derivatives to be obtained through reaction of urea and HDI.

As the allophanate-type modified derivatives, preferred are allophanate-type modified derivatives to be obtained through reaction of urethane and IPDI.

As the polythiol compound (A) to be combined with at least one of the above-mentioned TMP adduct-type modified derivatives, isocyanurate-type modified derivatives, burette-type modified derivatives and allophanates-type modified derivatives, preferred are one or two of primary thiol group-having β-mercaptopropionates and primary thiol group-having thiol isocyanurate compounds.

Here, the primary thiol group-having β-mercaptopropionate is preferably at least one of pentaerythritol tetrakis(3-mercaptopropionate) (PEMP) and dipentaerythritol hexakis (3-mercaptopropionate) (DPMP). As the primary thiol group-having thiol isocyanurate compound, preferred is a primary thiol group-having thiol isocyanurate compound in which the number of the thiol groups in one molecule is 3, and more preferred is tris-[(3-mercaptopropionyloxy)-ethyl] isocyanurate (TEMPIC).

The isocyanate group-containing compound (B) for use in the present invention is, from the viewpoint of the reactivity thereof with a polythiol compound and from the viewpoint of securing sufficient adhesiveness as an adhesive, preferably one having an isocyanate group content (NCO content) of from 3% by mass to 55% by mass, more preferably from 6% by mass to 50% by mass.

The NCO content is measured according to JIS K 1603.
<Radical Generator (C)>

As the radical generator (C), usable here is at least one of a thermal radical generator and a photoradical generator. Of those, from the viewpoint of improving the adhesion force and from the viewpoint that the composition can adhere nontransparent (lightproof) rubber, preferred is a thermal radical generator, more preferred is a thermal radical generator containing a peroxide, and even more preferred is a thermal radical generator containing an organic peroxide.

One of the radical generators (C) may be used singly or two or more thereof may be used in combination.

The thermal radical generator containing an organic peroxide includes, for example, t-butyl 2-ethylperoxyhexanoate, dilauroyl peroxide, 1,1,3,3-tetramethylbutylperoxy-2-ethylhexanoate, 1,1-di(t-hexylperoxy)cyclohexanone, di-t-butyl peroxide, t-butylcumyl peroxide, 1,1-di(t-hexylperoxy)-3,3,5-trimethylcyclohexane, t-amylperoxy-2-ethyl hexanoate, di(2-t-butylperoxyisopropyl)benzene, di(t-butyl)peroxide, 1,1'-di(2-t-butylperoxyisopropyl)benzene, benzoyl peroxide, 1,1'-di(t-butylperoxy)cyclohexane, di(3, 5,5-trimethylhexanoyl)peroxide, t-butylperoxy neodecanoate, t-hexylperoxy neodecanoate, dicumyl peroxide, etc. Of those, preferred is at least one of t-butyl-2-ethylperoxyhexanoate, dilauroyl peroxide, 1,1,3,3-tetramethylbutylperoxy-2-ethylhexanoate, 1,1-di(t-butylperoxy)cyclohexanone, di-t-butyl peroxide, and t-butylcumyl peroxide. One of the thermal radical generators containing an organic peroxide may be used singly or two or more thereof may be used in combination.

The thermal radical generator containing an inorganic peroxide includes a redox generator containing a combination of an oxidizing agent and a reducing agent, such as a combination of hydrogen peroxide and an iron(II) salt, a combination of a persulfate and sodium hydrogensulfite, etc. One of the thermal radical generators containing an inorganic peroxide may be used singly or two or more thereof may be used in combination.

As the photoradical generator, any known ones may be used here widely with no specific limitation thereon.

For example, there is mentioned an intramolecular-cleaving photoradical generator, which includes a benzoin alkyl ether-type photoradical generator such as benzoin ethyl ether, benzoin isobutyl ether, benzoin isopropyl ether, etc.; an acetophenone-type photoradical generator such as 2,2-diethoxyacetophenone, 4'-phenoxy-2,2-dichloroacetophenone, etc.; a propiophenone-type photoradical generator such as 2-hydroxy-2-methylpropiophenone, 4'-isopropyl-2-hydroxy-2-methylpropiophenone, 4'-dodecyl-2-hydroxy-2-methylpropiophenone, etc.; benzyl dimethyl ketal, 1-hydroxycyclohexyl phenyl ketone; an anthraquinone-type photoradical generator such as 2-ethylanthraquinone, 2-chloroanthraquinone, etc.; an acylphosphine oxide-type photoradical generator, etc.

Furthermore, as the hydrogen-drawing photoradical generator, there are mentioned a benzophenone/amine-type photoradical generator, a Michler ketone/benzophenone-type photoradical generator, a thioxanthone/amine-type photoradical generator, etc. Also usable here is a non-extracting photoradical generator for preventing migration of an unreacted photoradical generator. For example, there are mentioned a polymerized derivative of an acetophenone-type radical generator, and a benzophenone derivative obtained by adding the double bond of an acrylic group to benzophenone.

One of these photoradical generators may be used singly or two or more thereof may be used in combination.
<Optional Component>

Any optional component may be blended in the composition of the present invention. The optional component includes a urethanation catalyst, a surface conditioner, a solvent, a binder, a filler, a pigment dispersant, a conductivity-imparting agent, a UV absorbent, an antioxidant, a drying inhibitor, a penetrant, a pH regulator, a metal sequestering agent, an antibacterial antifungal agent, a surfactant, a plasticizer, a wax, a leveling agent, etc.
(Urethanation Catalyst (D))

As the urethanation catalyst (D), usable here is any urethanation catalyst. The urethanation catalyst includes organic tin compounds such as dibutyltin dilaurate, dibutyltin diacetate, dibutyltin thiocarboxylate, dibutyltin dimaleate, dioctyltin thiocarboxylate, tin octenoate, monobutyltin oxide, etc.; inorganic tin compounds such as stannous chloride, etc.; organic lead compounds such as lead octenoate, etc.; amines such as bis(2-diethylaminoethyl) ether, N,N,N',N'-tetramethylhexamethylenediamine, triethylenediamine (TEDA), benzyldimethylamine, 2,2'-dimorpholinoethyl ether, N-methylmorpholine, etc.; organic sulfonic acids such as p-toluenesulfonic acid, methanesulfonic acid, fluorosulfuric acid, etc.; inorganic acids such as sulfuric acid, phosphoric acid, perchloric acid, etc.; bases such as sodium alcoholate, lithium hydroxide, aluminium alcoholate, sodium hydroxide, etc.; titanium compounds such as tetrabutyl titanate, tetraethyl titanate, tetraisopropyl titanate, etc.; bismuth compounds; quaternary ammonium salts, etc. Of those, preferred are amines, and more preferred is triethylenediamine (TEDA). One of such catalysts may be used singly or two or more thereof may be used in combination.

(Surface Conditioner (E))

As the surface conditioner (E), usable here is any surface conditioner. The surface conditioner includes acrylic, vinylic, silicone-based, or fluorine-containing surface conditioner, and the like. Of those, preferred are silicone-based surface conditioners from the viewpoint of the compatibility and the surface tension-lowering capability thereof.

(Solvent)

The solvent is not specifically limited and may be any one not reacting with the other compounding ingredients, and examples thereof include an aromatic solvent and an aliphatic solvent.

Specific examples of the aromatic solvent include toluene, xylene, etc. The aliphatic solvent includes hexane, etc.

<Amount of Each Component>

The ratio of the total molar number of the isocyanate group contained in the isocyanate-containing compound (B) blended to the total molar number of the thiol group contained in the polythiol compound (A) blended (isocyanate group/thiol group) is preferably from 0.20 to 0.78. When the ratio (isocyanate group/thiol group) falls within the range, the composition can be fully and firmly cured and the adhesion strength thereof is high. In addition, the amount of the thiol group is sufficient relative to the amount of the isocyanate group, and therefore thiol-ene reaction can be sufficiently carried out between the thiol group and the carbon-carbon double bond of a rubber member so that the composition can be firmly adhered to the rubber member and the adhesion strength thereof can be high. The ratio (isocyanate group/thiol group) is more preferably 0.3 or more and preferably 0.7 or less, and is even more preferably from 0.3 to 0.6.

Here, the total molar number of the thiol group contained in the polythiol compound (A) to be blended can be calculated by multiplying the molar number of the polythiol compound (A) to be blended by the number of the thiol groups that one molecule of the polythiol compound (A) has.

The total molar number of the isocyanate group contained in the isocyanate group-containing compound (B) to be blended can be measured according to the Method B in JIS K1603-1.

Further, the molar number ratio (isocyanate group/thiol group) may be calculated by dividing the total molar number of the isocyanate group contained in the isocyanate group-containing compound (B) to be blended, as measured in the manner as above, by the total molar number of the thiol group contained in the polythiol compound (A) to be blended.

The ratio of the total molar number of the radical generator (C) to be blended to the total molar number of the thiol group contained in the polythiol compound (A) to be blended (radical generator (C)/thiol group) is preferably 0.025 or more. With this, the adhesiveness could be improved. From this viewpoint, the ratio (radical generator (C)/thiol group) is more preferably 0.03 or more, even more preferably 0.035 or more, still more preferably 0.04 or more. From the viewpoint of improving the adhesiveness, the ratio (radical generator (C)/thiol group) is preferably 0.5 or less, more preferably 0.45 or less, even more preferably 0.4 or less.

As an optional component, a compound containing a carbon-carbon double bond may be blended in the composition. However, when the amount of the carbon-carbon double bond-containing compound blended is too large, then the polythiol compound (A) may react with the carbon-carbon double bond-containing compound. As a result, the thiol-ene reaction between the polythiol compound (A) and the carbon-carbon double bond in rubber would hardly occur, and therefore the adhesion force of the composition to rubber may lower. As the case may be, owing to the hydrogen drawing reaction from the carbon-carbon bond main chain of rubber by this, the reaction between the sulfur atom of the thiol group of the polythiol compound (A) and the carbon atom of the carbon-carbon bond to chemically bind to each other could hardly occur so that the adhesion force of the composition to rubber may lower. Consequently, the ratio of the total molar number of the carbon-carbon double bond contained in the carbon-carbon double bond-containing compound to be blended, to the total molar number of the thiol group contained in the polythiol compound (A) to be blended (carbon-carbon double bond/thiol group) is preferably less than 0.4, more preferably less than 0.1, even more preferably 0.08 or less, still more preferably 0.05 or less, and most preferably 0.01 or less.

Here, the total molar number of the carbon-carbon double bond contained in the carbon-carbon double bond-containing compound to be blended may be calculated by multiplying the molar number of the compound to be blended by the number of the carbon-carbon double bonds that one molecule of the compound has.

The molar number ratio (carbon-carbon double bond/thiol group) may be calculated by dividing the total molar number of the carbon-carbon double bond, as measured in the manner as above, by the total molar number of the thiol group contained in the polythiol compound (A) to be blended.

As described above, the composition of the present invention may contain any optional component in addition to the indispensable compounds (A) to (C). However, from the viewpoint of strongly adhering to rubber, especially to vulcanized rubber, the total content of the components (A) to (C) in the composition is preferably 80% by mass or more, more preferably 90% by mass or more, even more preferably 95% by mass or more, still more preferably 98% by mass or more.

From the same viewpoint, the total content of the components (A) to (E) is preferably 90% by mass or more, more preferably 95% by mass or more, even more preferably 99% by mass or more, and further more preferably 100% by mass.

[Adhesive]

The adhesive of the present invention contains the above-mentioned composition. The adhesive may contain any other component than the above-mentioned composition within a range not detracting from the object of the present invention. However, from the viewpoint of favorably expressing the effects of the present invention, the content of the composition in the adhesive is preferably 90% by mass or more, more preferably 95% by mass or more, even more preferably 99% by mass or more, and further more preferably 100% by mass.

In coating with the adhesive, the thickness of the adhesive may be suitably selected in accordance with the subject to which the agent is applied and with the necessary adhesion strength, etc. For example, the thickness may be from 1 μm to 1000 μm, preferably from 20 μm to 300 μm, more preferably from 30 μm to 200 μm.

[Adhesive Sheet]

The adhesive sheet of the present invention is produced, using the above-mentioned composition.

The adhesive sheet can be favorably obtained by applying the composition onto a release sheet such as a release paper, a release film or the like and keeping the sheet form. It is considered that, during the keeping operation, at least a part of the thiol group and the isocyanate group in the composition could react through thiol-urethanation reaction to give a sheet form. After the coating application, this is left at room temperature and, as a result, an adhesive sheet could be favorably produced. Also, after the coating operation, this may be heated in such a manner that the radical reaction would not be started by the radical generator, thereby giving an adhesive sheet. From the above-mentioned viewpoints, the ambient temperature or the heating temperature after the coating operation is preferably from −30 to 60° C., more preferably from −20 to 40° C., even more preferably from 0 to 40° C.

The standing time may be controlled by the amount of the urethanation catalyst. From the viewpoint of securing good operability in sheet formation and securing good maintenance of the sheet form during adhesion operation, the time is preferably 30 minutes or more, more preferably 60 minutes or more.

The material of the release sheet is not specifically limited, for which, however, favorably usable here are transparent resin substrates containing, as the main ingredient thereof, an organic resin, for example, a polyester resin such as polyethylene terephthalate, polycyclohexylene terephthalate, polyethylene naphthalate or the like, a polyamide resin such as nylon 46, modified nylon 6T, nylon MXD6, polyphthalamide or the like, a ketone resin such as polyphenylene sulfide, polythioether sulfone or the like, a sulfone resin such as polysulfone, polyether sulfone or the like, as well as polyether nitrile, polyarylate, polyether imide, polyamideimide, polycarbonate, polymethyl methacrylate, triacetyl cellulose, polystyrene, polyvinyl chloride or the like.

The thickness of the adhesive sheet may be suitably selected depending on the subject to which the sheet is to be adhered and the adhesion strength of the sheet, etc. For example, the thickness is from 1 μm to 1000 preferably from 20 μm to 300 μm, more preferably from 30 μm to 200 μm.

[Laminate]

The laminate of the present invention is a laminate including two or more layers bonded to each other, wherein at least one layer is a rubber layer, and the rubber layer is adhered to the adjacent layer via the above-mentioned adhesive or adhesive sheet.

The plural layers may be all rubber layers, or may contain any other layer than a rubber layer.

The dimension of each layer and the number of the layers may be suitably selected depending on the intended object.

<Rubber Layer>

The rubber layer may be a vulcanized rubber or an unvulcanized rubber.

Preferably, the rubber that constitutes the rubber layer has a carbon-carbon double bond. In this case, it is presumed that the carbon atom of the carbon-carbon double bond that the rubber layer adjacent to the adhesive or the adhesive sheet has may form a carbon-sulfur bond along with the sulfur atom of the thiol group of the polythiol compound (A) that the adhesive or the adhesive sheet has.

However, it is presumed that, even though the rubber to constitute the rubber layer does not have a carbon-carbon double bond, a laminate could be obtained. In this case, it is presumed that, owing to the hydrogen-drawing reaction from the carbon-carbon bond main chain existing in rubber by the polythiol compound (A), the sulfur atom of the thiol group in the polythiol compound (A) could chemically bind to the carbon atom of the carbon-carbon bond. However, from the viewpoint of improving the adhesion force of the laminate, it is desirable that the rubber to constitute the rubber layer has a carbon-carbon double bond.

The material of the rubber layer is not specifically limited. For example, preferred are natural rubber; conjugated dienic synthetic rubber such as polyisoprene synthetic rubber (IR), polybutadiene rubber (BR), styrene-butadiene copolymer rubber (SBR), acrylonitrile-butadiene rubber (NBR), chloroprene rubber (CR), butyl rubber (IIR), etc.; as well as ethylene-propylene copolymer rubber (EPM), ethylene-propylene-diene copolymer rubber (EPDM), polysiloxane rubber, etc. Of those, preferred are natural rubber and conjugated dienic synthetic rubber. Two or more rubber components may be combined for use herein.

<Other Layer than Rubber Layer>

As the other layer than the rubber layer, there are mentioned a metal layer and a resin layer. Using the adhesive and the adhesive sheet of the present invention, these metal layer and resin layer can be firmly bond. It is presumed that the thiol group in the composition can act as a base to readily form a strong bond to a metal compound, and it is also presumed that the thiol group may readily form a bond to a resin compound through hydrogen-drawing reaction therebetween.

<Production Method for Laminate (Using Adhesive)>

Next, a production method for a laminate using an adhesive is described below.

The laminate of the present invention can be favorably obtained by adhering the adjacent layers with the adhesive of the present invention.

For example, first, an adhesive is applied to a rubber layer or to the other layer than a rubber layer to face to a rubber layer. Next, if desired, the resultant structure is kept as such for a given period of time, and the other layer is brought into contact with the adhesive-coated surface to give a layered body. In this step, the adhesive may be applied to any one of the two surfaces to face to each other, or the adhesive may be applied to both the two. Next, optionally while given a pressure in the thickness direction thereof, the layered body is cured to give a laminate in a preferred mode.

In the case where the layered body is kept standing as such for a given period of time after the adhesive application, the standing time is preferably from 0 to 30 minutes, more preferably from 1 to 15 minutes from the viewpoint that the form of the adhesive is kept as such without leaking out from the layered body during curing. In the case where the adhesive is applied to both the facing two layers, it is necessary that the layers must be bonded together before completion of the curing reaction between the polythiol compound and the isocyanate group-containing compound. This is because, when the reaction between the polythiol compound and the isocyanate group-containing compound has been finished before the bonding operation, the reaction point between the thiol group and the isocyanate group would be lost in the bonding interface and, as a result, the layers to be bonded could not be bonded to each other.

In the case where the layered body is given a pressure, the pressure is preferably from 0 MPa to 5 MPa, more preferably from 0 MPa to 2.5 MPa, even more preferably from 0

MPa to 1 MPa, from the viewpoint of improving the adhesion force and from the viewpoint of preventing or retarding the adhesive from leaking out of the laminate. Also from the same viewpoints, the pressing time is preferably from 5 minutes to 120 minutes, more preferably from 10 minutes to 60 minutes, even more preferably from 15 minutes to 45 minutes.

In the case where the adhesive contains a thermal radical generator as a radical generator, it is preferable to perform curing by heating. As the heating temperature, a temperature at which the thermal radical generator could efficiently generate radicals may be suitably selected, and the temperature is preferably around the one-minute half-life temperature of the thermal radical generator±30° C.

In the case where the adhesive contains a photoradical generator as a radical generator, it is preferable to cure the body by photoirradiation. As the light, preferably used here is at least one selected from electromagnetic waves such as UV rays, visible rays, IR rays, X rays, etc.; and corpuscular beams such as α rays, γ rays, electron rays, etc. Of those, UV rays are preferred as the light. From the viewpoint of improving the adhesion force and from the viewpoint of cost reduction, a UV lamp is preferably used as the light source. Also from the same viewpoints, the photoirradiation time is preferably from a few seconds to several tens of seconds, more preferably from 1 to 40 seconds, even more preferably from 3 to 20 seconds.

In any operation of heating and photoirradiation, the site to be heated and the site to be subjected to photoirradiation are not specifically limited so far as heat energy or light energy could be transmitted to the adhesive, that is, any site of the layered body could be heated or photoirradiated. Namely, the adhesive may be directly heated or photoirradiated, or may be heated or photoirradiated via rubber and/or adherend.

The fact that a strong adhesion force can be realized even in the case where the body is cured by heating is advantageous in that the heating method can be employed even in the case where sufficient photoirradiation to the adhesive is difficult, and is additionally favorable in point of easy operation since any site of the layered body can be heated and/or photoirradiated to realize strong adhesion.

<Production Method for Laminate (Using Adhesive Sheet)>

Next, a production method for a laminate using an adhesive sheet is described below.

The laminate of the present invention can be favorably obtained by adhering the adjacent layers with the adhesive sheet of the present invention. The laminate may be one obtained using one adhesive sheet, or using two or more adhesive sheets.

For example, first, one adhesive sheet is put between adjacent layers to give a layered body. Next, while applying a pressure in the thickness direction thereof, if desired, the layered body is cured to obtain a laminate in a preferred mode.

In the case where the layered body is given a pressure, the pressure is preferably from 0.1 MPa to 5.0 MPa, more preferably from 0.2 MPa to 4.0 MPa, even more preferably from 0.3 MPa to 3.0 MPa, still more preferably from 0.4 MPa to 3.0 MPa, from the viewpoint of improving the adhesion force.

The other pressing condition (pressing time) than the above and the curing condition (heating temperature, heating time, light source, photoirradiation time) are the same as those in the above-mentioned case of using the adhesive.

In any operation of heating and photoirradiation, the site to be heated and the site to be given photoirradiation are not specifically limited so far as heat energy or optical energy is transmitted to the adhesive sheet. Any site of the layered body may be heated or photoirradiated. In other words, the adhesive sheet may be directly heated or photoirradiated, or the adhesive sheet may be heated or photoirradiated via rubber and/or adherend.

As described above, even in the case where the body is cured by heating, a strong adhesion force is given to the resultant body, and this is advantageous in that a heating method can be employed even in the case where sufficient photoirradiation to the adhesive is difficult, and is additionally favorable in point of easy operation since any site of the layered body can be heated and/or photoirradiated to realize strong adhesion.

EXAMPLES

The present invention is described in more detail with reference to Examples given below; however, the present invention is not whatsoever limited to the following Examples.

[Source Materials and Others]

As the source materials and others, the following were used.

<Polythiol Compound (A) (Component (A))>

Pentaerythritol tetrakis(3-mercaptopropionate) (PEMP): manufactured by SC Organic Chemical Co., Ltd., having 4 thiol groups.

Dipentaerythritol hexakis(3-mercaptopropionate) (DPMP): manufactured by SC Organic Chemical Co., Ltd., having 6 thiol groups.

Tris-[(3-mercaptopropionyloxy)-ethyl] isocyanurate (TEMPIC): manufactured by SC Organic Chemical Co., Ltd., trade name "TEMPIC", having 3 thiol groups.

Pentaerythritol tetrakis(3-mercaptobutyrate): manufactured by Showa Denko KK, trade name "Karens MT PE1", having 4 thiol groups (where the thiol group binds to the secondary carbon atom).

1,3,5-Tris(3-mercaptobutyloxyethyl)-1,3,5-triazine-2,4,6-(1H,3H,5H)-trione: manufactured by Showa Denko KK, trade name "Karens MT NR1", having 3 thiol groups (where the thiol group binds to the secondary carbon atom).

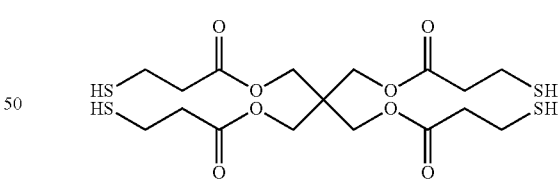

PEMP

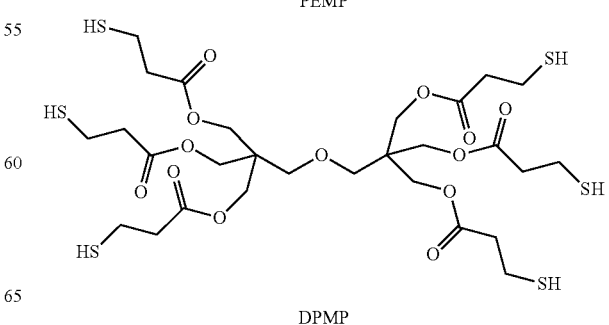

DPMP

-continued

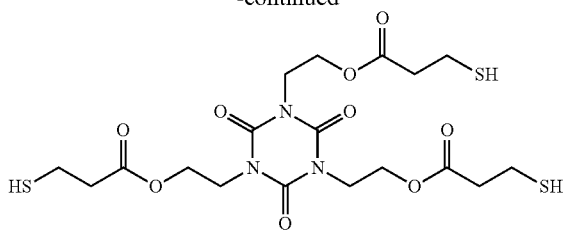

TEMPIC

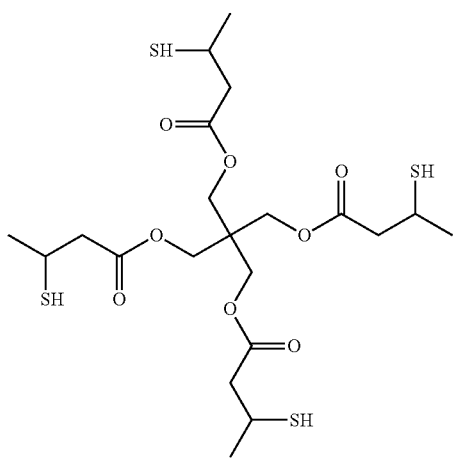

Karens MT PE1

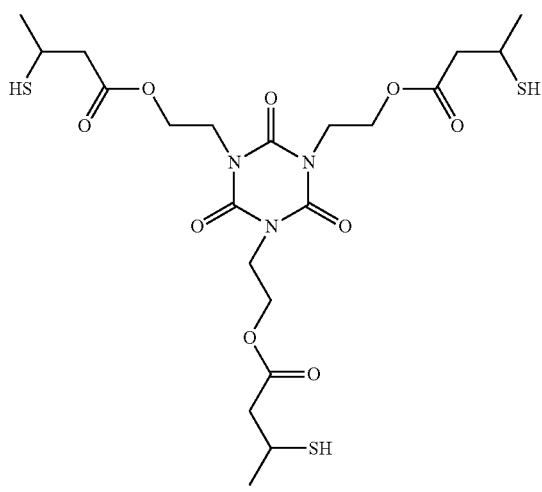

Karens MT NR1

<Isocyanate Group-Containing Compound (B) (Component (B))>

HDI burette-modified isocyanate: manufactured by Sumitomo Bayer Urethane Co., Ltd., trade name "Desmodur N3200", having NCO content of 23.0% by mass.

HDI isocyanurate-modified isocyanate: manufactured by Nippon Polyurethane Industry Co., Ltd., trade name "Coronate HXLV", having NCO content of 23.2% by mass.

IPDI isocyanurate-modified isocyanate: manufactured by Sumitomo Bayer Urethane Co., Ltd., trade name "Desmodur Z4470BA", having NCO content of 11.9% by mass.

IPDI allophanate-modified isocyanate: manufactured by Sumitomo Bayer Urethane Co., Ltd., trade name "Desmodur XP2565", having NCO content of 12.0% by mass.

TDI TMP adduct-modified isocyanate: manufactured by Sumitomo Bayer Urethane Co., Ltd., trade name "Desmodur L75(C)", having NCO content of 13.3% by mass.

TDI isocyanurate-modified isocyanate: manufactured by Mitsui Chemical Polyurethanes, Inc., trade name "D-204", having NCO content of 7.5% by mass.

XDI TMP adduct-modified isocyanate: manufacture by Mitsui Chemical Polyurethanes, Inc., trade name "D-110N", having NCO content of 11.5% by mass.

$H_6$XDI TMP adduct-modified isocyanate: manufactured by Mitsui Chemical Polyurethanes, Inc., trade name "D-120N", having NCO content of 11.0% by mass.

$H_6$XDI isocyanurate-modified isocyanate: manufactured by Mitsui Chemical Polyurethanes, Inc., trade name "D-127N", having NCO content of 13.5% by mass.

IPDI: manufactured by Evonik Degussa Japan Co., Ltd. trade name "VESTANAT IPDI", having NCO content of 37.6% by mass.

HDI: manufactured by Sumitomo Bayer Urethane Co., Ltd., trade name "Desmodur H", having NCO content of 49.7% by mass.

<Radical Generator (C) (Component (C))> t-Butyl 2-ethylperoxyhexanoate: manufactured by NOF Corporation, trade name "Perbutyl O".

<Urethanation Catalyst (D) (Component (D))>

Triethylenediamine (TEDA): manufactured by Air Products and Chemicals, Inc., trade name "DABCO 33LV catalyst".

<Surface Conditioner (E) (Component (E))>

Mixture of polyether-modified polydimethylsiloxane and polyether: manufactured by BYK Japan KK, trade name "BYK-307", content 100%.

[Measurement of Number of Thiol Groups]

The total molar number of the thiol group contained in the polythiol compound (A) to be blended is determined through calculation of dividing the blended amount of the compound by the theoretical molecular weight thereof followed by multiplying the resultant value by the number of the thiol groups that one molecule of the polythiol compound (A) has.

[Measurement of Number of Isocyanate Groups]

The total molar number of the isocyanate group contained in the isocyanate group-containing compound (B) to be blended is determined according to the method B in JIS K1603-1.

[Production of Rubber Member]

According to the compounding recipe shown in Table 1 below, rubber members (100 mm in length×25 mm in width×10 mm in thickness) were produced. Concretely, unvulcanized rubber that had been prepared by kneading the components as in Table 1 was rolled into a sheet having a size of 50 mm in length×270 mm in width×3.4 mm in thickness, and then three of these sheets were layered, and vulcanized in a mold having a size of 150 mm in length×270 mm in width×10 mm in thickness at 150° C. for 45 minutes. The resultant vulcanized rubber was cut into pieces each having a length of 100 mm and a width of 25 mm to be samples (rubber members) for tensile test.

TABLE 1

|  |  | Type of Rubber | | | | | |
|---|---|---|---|---|---|---|---|
|  |  | NR/BR | NR/SBR | SBR | NR/SBR/BR | NR/IR | NR |
| Compounding Formulation | NR | 50 | 50 | — | 40 | 50 | 100 |
|  | BR | 50 | — | — | 30 | — | — |
|  | SBR | — | 50 | 100 | 30 | — | — |
|  | IR | — | — | — | — | 50 | — |
|  | Carbon Black | 50 | 50 | 50 | 50 | 50 | 50 |
|  | Stearic Acid | 2 | 2 | 2 | 2 | 2 | 2 |
|  | Antiaging Agent | 1 | 1 | 1 | 1 | 1 | 1 |
|  | Zinc oxide | 3 | 3 | 3 | 3 | 3 | 3 |
|  | Vulcanization Accelerator 1 | 0.4 | 0.4 | 0.4 | 0.4 | 0.4 | 0.4 |
|  | Vulcanization Accelerator 2 | 0.2 | 0.2 | 0.2 | 0.2 | 0.2 | 0.2 |
|  | Sulfur | 1.4 | 1.4 | 1.4 | 1.4 | 1.4 | 1.4 |

\* The numerical value in Table is part by mass.
The details of the components in Table 1 are as follows:
Natural rubber (NR): RSS#3.
Polybutadiene rubber (BR): manufactured by JSR Corporation, trade name "JSR BRO1".
Styrene-butadiene copolymer rubber (SBR): manufactured by JSR Corporation, trade name "JSR 1500".
Polyisoprene synthetic rubber (IR): manufactured by JSR Corporation, trade name "JSR IR2200".
Carbon black: manufactured by Asahi Carbon Co., Ltd., trade name "Asahi #70".
Antiaging agent: N-phenyl-N'-(1,3-dimethylbutyl)-p-phenylenediamine, manufactured by Ouchi Shinko Chemical Industrial Co., Ltd., trade name "Nocrac 6C".
Vulcanization accelerator 1: 1,3-diphenylguanidine, manufactured by Ouchi Shinko Chemical Industrial Co., Ltd., trade name "Nocceler D (D-P)".
Vulcanization accelerator 2: di-2-benzothiazolyl disulfide, manufactured by Ouchi Shinko Chemical Industrial Co., Ltd., trade name "Nocceler DM-P (DM)".

(Steel Plate)

As a steel plate, used here was SPCC-SD manufactured by Test Piece Co., Ltd.

[Method for Measurement of Adhesion Force of Cured Adhesive]

The adhesive was applied to two rubber members so as to provide a thickness of 30 μm each, and the coated surfaces were stuck together and cured. For curing them, the two members were kept under a pressure of 0.05 MPa at a temperature of 150° C. for a given period of time. The rubber members were peeled in the direction of 180 degrees at a pulling rate of 50 mm/min to determine the peeling strength (N/25 mm) as an index of the adhesion thereof.

[Method for Measurement of Adhesion Force of Cured Adhesive Sheet]

The adhesive sheet having a thickness of 30 μm was sandwiched between rubber members and cured. For curing it, the sheet was kept as such while pressed under a pressure of 2.5 MPa at a temperature of 150° C. for a given period of time. The rubber members were peeled in the direction of 180 degrees at a pulling rate of 50 mm/min to determine the peeling strength (N/25 mm) as an index of the adhesion thereof.

Regarding the value of the adhesion force, the force of 100 N/25 mm or more means a sufficient adhesion force on a level of breakage of the rubber substrate. The adhesive force is preferably 300 N/25 mm or more. On the other hand, the force less than 100 N/25 mm means that the reaction between the substrate and the adhesive is insufficient so that the two are in a state of peeling at the interface therebetween, or means that the cohesion force of the adhesive is insufficient so that the adhesive itself is under cohesion failure. In those states, it could not be said that the adhesion force would be sufficient.

[Method for Measurement of Curing Time and Evaluation Standards]

In bonding the rubber members using the adhesive and the adhesive sheet, the time that had elapsed before the surface tack disappeared was referred to as the curing time. Based on the curing time, the curing rate was evaluated according to the following criteria.

A: The curing time was less than 3 hours.
B: The curing time was from 3 hours to less than 5 hours.
C: The curing time was 5 hours or more.

Examples 1 to 10 and Comparative Examples 1 to 6, and Examples 11 to 20 and Comparative Examples 7 to 12

In Examples 1 to 6 and Comparative Examples 1 to 6 (adhesives), the ratio of the total molar number of the isocyanate group contained in the isocyanate group-containing compound (B) to be blended to the total molar ratio of the thiol group contained in the polythiol compound (A) to be blended (isocyanate group/thiol group) was kept constant (0.5) and the combination of the polythiol compound (A) and the isocyanate group-containing compound was varied, and in these, the curing time and the adhesion force were evaluated between the adhesives.

In Examples 7 to 10 (adhesives), the ratio of the total molar number of the isocyanate group contained in the isocyanate group-containing compound (B) to be blended to the total molar ratio of the thiol group contained in the polythiol compound (A) to be blended was varied, and the relationship between the ratio (isocyanate group/thiol group), and the curing time and the adhesion force was investigated.

Further, in Examples 11 to 20 and Comparative Examples 7 to 12 (adhesive sheets), the same evaluation as in the above was carried out except that the adhesive sheets were used in place of the adhesives in Examples 1 to 10 and Comparative Examples 1 to 6 (adhesives).

Next, these Examples and Comparative Examples are described specifically.

Examples 1 to 10, Comparative Examples 1 to 6 (Adhesive Compositions)

The components were formulated as shown in Table 2 below (in which the numerical value of each component means part by mass) to give a composition, and the composition was used as an adhesive.

The resultant adhesive was cured in the manner as above, and the curing time of the adhesive and the adhesion force of the cured adhesive were measured in the manner as above. As the rubber member, used was NR/BR. The results are shown in Table 3.

In Table 2 as well as Table 4, Table 6 and Table 8, the thiol functional group concentration means the concentration of the thiol group (mmol/g) in the total amount of the constitutive components of the adhesive or the adhesive sheet. The NCO functional group concentration means the concentration of the isocyanate group (mmol/g) in the total amount of the constitutive components of the adhesive or the adhesive sheet. Further, the generator concentration means the concentration of the radical generator (mmol/g) in the total amount of the constitutive components of the adhesive or the adhesive sheet. In these, the constitutive components may mutually react with each other or may decompose, and therefore, the value is one calculated before such reaction or decomposition of the constitutive components, that is, the value is the theoretical value calculated from the amount of each constitutive component just before actually compounded.

Examples 11 to 20, Comparative Examples 7 to 12 (Adhesive Sheets)

As shown in Table 2, in Examples 11 to 20 and Comparative Examples 7 to 12, the same adhesives as those in Examples 1 to 10 and Comparative Examples 1 to 6, respectively, were prepared.

The adhesive was applied onto a PET-made release sheet, and kept at room temperature for a given period of time to produce an adhesive sheet having a length of 100 mm, a width of 25 mm and a thickness of 30 μm.

The resultant adhesive sheet was cured in the manner as above, and also in the manner as above, the curing time of the adhesive and the adhesion force of the cured adhesive sheet was measured. As the rubber member, NR/BR was used like in Example 1. The results are shown in Table 3.

Examples 21 to 26 and Comparative Example 13, and Examples 27 to 32 and Comparative Example 14

In Examples 21 to 26 and Comparative Example 13 (adhesive), the ratio of the total molar number of the radical generator (C) to be blended to the total molar ratio of the thiol group contained in the polythiol compound (A) to be blended mainly (radical generator (C)/thiol group) was varied, and the relationship between the ratio (radical generator (C)/thiol group), and the curing time and the adhesion force of the adhesive was investigated.

In Examples 27 to 32 and Comparative Example 14 (adhesive sheet), the relationship between the ratio (radical generator (C)/thiol group), and the curing time and the adhesion force of the adhesive was investigated in the same manner as in the above-mentioned Examples 21 to 26 and Comparative Example 13 (adhesive) except that the adhesive sheet was used in place of the adhesive.

Next, these Examples and Comparative Examples are described specifically.

Examples 21 to 26 and Comparative Example 13

The same operation as in Example 1 was carried out except that the formulations were changed to those in Table 4. The results are shown in Table 5.

Examples 27 to 32 and Comparative Example 14

The same operation as in Example 11 was carried out except that the formulations were changed to those in Table 4. The results are shown in Table 5.

Examples 33 to 38 and Examples 39 to 44

In Examples 33 to 38 (adhesives), the type of rubber being the object to be adhered was varied, and the relationship between the type of rubber being the object to be adhered, and the curing time and the adhesion force of the adhesive was investigated.

In Examples 39 to 44 (adhesive sheets), the relationship between the type of rubber to be the object to be adhered, and the curing time and the adhesion force of the adhesive sheets was investigated in the same manner as in the above-mentioned Examples 33 to 38 (adhesives) except that the adhesive was changed to the adhesive sheet.

Next, these Examples are described specifically.

Examples 33 to 38

The same operation as in Example 1 was carried out except that the formulations were changed to those in Table 6 and the rubber member shown in Table 7 was used. The results are shown in Table 7.

Examples 39 to 44

The same operation as in Example 11 was carried out except that the formulations were changed to those in Table 6 and the rubber member shown in Table 7 was used. The results are shown in Table 7.

Examples 45 to 54 and Examples 55 to 64

In Examples 45 to 54 (adhesives), the type of the isocyanate group-containing compound (B) to be blended was changed, and the relationship between the type of the isocyanate group-containing compound (B), and the curing time and the adhesion force of the adhesive was investigated.

In Examples 55 to 64 (adhesive sheets), the relationship between the type of isocyanate group-containing compound (B), and the curing time and the adhesion force of the adhesive was investigated in the same manner as in the above-mentioned Examples 45 to 54 (adhesives) except that the adhesive was changed to the adhesive sheet.

Next, these Examples are described specifically.

Examples 45 to 54 (Adhesives)

The same operation as in Example 1 was carried out except that the formulations were changed to those in Table 8 and the isocyanate group-containing compound (B) shown in Table 9 was used. The results are shown in Table 9.

Examples 55 to 64 (Adhesive Sheets)

The same operation as in Example 11 was carried out except that the formulations were changed to those in Table 8 and the isocyanate group-containing compound (B) shown in Table 9 was used. The results are shown in Table 9.

TABLE 2

| | | Formulation | | | | | | |
|---|---|---|---|---|---|---|---|---|
| | | Component (A) | | Component (B) | | | | |
| Adhesive | Adhesive Sheet | Type | Amount Blended (part by mass) | Type | Amount Blended (part by mass) | Component (C) Perbutyl O (part by mass) | Component (D) TEDA (part by mass) | Component (E) BYK-307 (part by mass) |
| Example 1 | Example 11 | PEMP | 51.3 | N3200 | 38.3 | 9.4 | 0.001 | 1 |
| Example 2 | Example 12 | PEMP | 45.2 | Z4470BA | 45.7 | 8.2 | 0.005 | 0.9 |
| Example 3 | Example 13 | DPMP | 52.9 | N3200 | 37.1 | 9.0 | 0.005 | 1.1 |
| Example 4 | Example 14 | DPMP | 46.8 | Z4470BA | 44.3 | 8.0 | 0.005 | 0.9 |
| Example 5 | Example 15 | TEMPIC | 59.9 | N3200 | 31.3 | 7.6 | 0.006 | 1.2 |
| Example 6 | Example 16 | TEMPIC | 54.0 | Z4470BA | 38.1 | 6.9 | 0.005 | 1.1 |
| Example 7 | Example 17 | DPMP | 71.6 | N3200 | 15.0 | 11.9 | 0.007 | 1.4 |
| Example 8 | Example 18 | DPMP | 68.2 | N3200 | 19.1 | 11.3 | 0.007 | 1.4 |
| Example 9 | Example 19 | DPMP | 43.9 | N3200 | 47.9 | 7.3 | 0.004 | 0.9 |
| Example 10 | Example 20 | DPMP | 43.4 | N3200 | 48.6 | 7.2 | 0.004 | 0.9 |
| Comparative Example 1 | Comparative Example 7 | Karens MT PE1 | 53.9 | N3200 | 36.2 | 8.8 | 0.005 | 1.1 |
| Comparative Example 2 | Comparative Example 8 | Karens MT PE1 | 47.8 | Z4470BA | 43.4 | 7.8 | 0.005 | 1 |
| Comparative Example 3 | Comparative Example 9 | Karens MT NR1 | 61.7 | N3200 | 29.8 | 7.3 | 0.006 | 1.2 |
| Comparative Example 4 | Comparative Example 10 | Karens MT NR1 | 55.8 | Z4470BA | 36.5 | 6.6 | 0.006 | 1.1 |
| Comparative Example 5 | Comparative Example 11 | no thiol group | 0.0 | N3200 | 77.8 | 20.0 | 0.001 | 2.2 |
| Comparative Example 6 | Comparative Example 12 | PEMP | 83.2 | no isocyanate group | 0.0 | 15.2 | 0.001 | 1.7 |

| Adhesive | Isocyanate Group/Thiol Group (molar ratio) | Component (C)/Thiol Group (molar ratio) | Concentration of Thiol Functional Group (mmol/g) | Concentration of NCO Functional Group (mmol/g) | Generator Concentration (mmol/g) |
|---|---|---|---|---|---|
| Example 1 | 0.5 | 0.10 | 4.20 | 2.10 | 0.43 |
| Example 2 | 0.5 | 0.10 | 3.70 | 1.29 | 0.38 |
| Example 3 | 0.5 | 0.10 | 4.05 | 2.03 | 0.42 |
| Example 4 | 0.5 | 0.10 | 3.59 | 1.25 | 0.37 |
| Example 5 | 0.5 | 0.10 | 3.42 | 1.71 | 0.35 |
| Example 6 | 0.5 | 0.10 | 3.08 | 1.08 | 0.32 |
| Example 7 | 0.15 | 0.10 | 5.49 | 0.82 | 0.55 |
| Example 8 | 0.20 | 0.10 | 5.23 | 1.05 | 0.52 |
| Example 9 | 0.78 | 0.10 | 3.36 | 2.62 | 0.34 |
| Example 10 | 0.80 | 0.10 | 3.32 | 2.66 | 0.33 |
| Comparative Example 1 | 0.5 | 0.10 | 3.96 | 1.98 | 0.41 |
| Comparative Example 2 | 0.5 | 0.10 | 3.51 | 1.23 | 0.36 |
| Comparative Example 3 | 0.5 | 0.10 | 3.26 | 1.63 | 0.34 |
| Comparative Example 4 | 0.5 | 0.10 | 2.95 | 1.03 | 0.30 |
| Comparative Example 5 | — | — | 0.00 | 4.26 | 0.92 |
| Comparative Example 6 | 0.0 | 0.10 | 6.80 | 0.00 | 0.70 |

TABLE 3

| Component (A) | Adhesive | Curing Time | Adhesion Force (N/25 mm) | Remarks | Adhesive Sheet | Curing Time | Adhesion Force (N/25 mm) | Remarks |
|---|---|---|---|---|---|---|---|---|
| PEMP | Example 1 | A | 883 | — | Example 11 | A | 929 | — |
| PEMP | Example 2 | A | 780 | — | Example 12 | A | 826 | — |
| DPMP | Example 3 | A | 428 | — | Example 13 | A | 450 | — |
| DPMP | Example 4 | A | 376 | — | Example 14 | A | 422 | — |
| TEMPIC | Example 5 | A | 435 | — | Example 15 | A | 450 | — |
| TEMPIC | Example 6 | A | 350 | — | Example 16 | A | 368 | — |
| DPMP | Example 7 | B | 91 | — | Example 17 | B | 95 | — |
| DPMP | Example 8 | A | 115 | — | Example 18 | A | 111 | — |
| DPMP | Example 9 | A | 150 | — | Example 19 | A | 169 | — |
| DPMP | Example 10 | B | 92 | — | Example 20 | B | 94 | — |
| Karens MT PE1 | Comparative Example 1 | C | 75 | — | Comparative Example 7 | C | 85 | — |
| Karens MT PE1 | Comparative Example 2 | C | 52 | — | Comparative Example 8 | C | 62 | — |
| Karens MT NR1 | Comparative Example 3 | C | 68 | — | Comparative Example 9 | C | 74 | — |
| Karens MT NR1 | Comparative Example 4 | C | 60 | — | Comparative Example 10 | C | 68 | — |
| no thiol group | Comparative Example 5 | C | 14 | not cured | Comparative Example 11 | C | — | not cured |
| PEMP | Comparative Example 6 | C | — | not cured | Comparative Example 12 | C | — | not cured |

TABLE 4

| | | Formulation | | | | |
|---|---|---|---|---|---|---|
| | | Component (A) | | Component (B) | Component (C) | Component (D) | Component (E) |
| Adhesive | Adhesive Sheet | PEMP (part by mass) | DPMP (part by mass) | N3200 (part by mass) | Perbutyl O (part by mass) | TEDA (part by mass) | BYK-307 (part by mass) |
| Comparative Example 13 | Comparative Example 14 | 56.6 | — | 42.3 | 0 | 0.001 | 1.1 |
| Example 21 | Example 27 | 56.0 | — | 41.8 | 1 | 0.001 | 1.1 |
| Example 22 | Example 28 | 53.8 | — | 40.2 | 4.9 | 0.001 | 1.1 |
| Example 1 | Example 11 | 51.3 | — | 38.3 | 9.4 | 0.001 | 1 |
| Example 23 | Example 29 | 46.9 | — | 35 | 17.1 | 0.001 | 0.9 |
| Example 24 | Example 30 | 37.3 | — | 27.9 | 34.1 | 0.001 | 0.7 |
| Example 25 | Example 31 | — | 52.5 | 28.4 | 18 | 0.001 | 1.1 |
| Example 26 | Example 32 | 41.1 | — | 43 | 15 | 0.001 | 0.8 |

| Adhesive | Isocyanate Group/Thiol Group (molar ratio) | Component (C)/Thiol Group (molar ratio) | Concentration of Thiol Functional Group (mmol/g) | Concentration of NCO Functional Group (mmol/g) | Generator Concentration (mmol/g) |
|---|---|---|---|---|---|
| Comparative Example 13 | 0.5 | 0 | 4.63 | 2.32 | 0.00 |
| Example 21 | 0.5 | 0.01 | 4.58 | 2.29 | 0.05 |
| Example 22 | 0.5 | 0.05 | 4.40 | 2.20 | 0.23 |
| Example 1 | 0.5 | 0.1 | 4.20 | 2.10 | 0.43 |
| Example 23 | 0.5 | 0.2 | 3.84 | 1.92 | 0.79 |
| Example 24 | 0.5 | 0.5 | 3.05 | 1.53 | 1.57 |
| Example 25 | 0.2 | 0.2 | 4.03 | 0.81 | 0.83 |
| Example 26 | 0.7 | 0.2 | 3.37 | 2.36 | 0.69 |

TABLE 5

| Component (C)/ Thiol Group (molar ratio) | Adhesive | | | | Adhesive Sheet | | | |
|---|---|---|---|---|---|---|---|---|
| | | Curing Time | Adhesion Force (N/25 mm) | Remarks | | Curing Time | Adhesion Force (N/25 mm) | Remarks |
| 0 | Comparative Example 13 | — | 45 | — | Comparative Example 14 | A | 42 | — |
| 0.01 | Example 21 | — | 113 | — | Example 27 | A | 115 | — |
| 0.05 | Example 22 | — | 420 | — | Example 28 | A | 259 | — |
| 0.1 | Example 1 | — | 883 | — | Example 11 | A | 929 | — |
| 0.2 | Example 23 | — | 587 | — | Example 29 | A | 850 | — |
| 0.5 | Example 24 | — | 420 | — | Example 30 | A | 763 | — |
| 0.2 | Example 25 | — | 168 | — | Example 31 | A | 150 | — |
| 0.2 | Example 26 | — | 585 | — | Example 32 | A | 680 | — |

TABLE 6

| Adhesive | Adhesive Sheet | Formulation | | | | | | |
|---|---|---|---|---|---|---|---|---|
| | | Component (A) | | Component (B) | | Component (C) | Component (D) | Component (E) |
| | | PEMP (part by mass) | DPMP (part by mass) | N3200 (part by mass) | L75(C) (part by mass) | Perbutyl O (part by mass) | TEDA (part by mass) | BYK-307 (part by mass) |
| Example 1 | Example 11 | 51.3 | — | 38.3 | — | 9.4 | 0.001 | 1 |
| Example 33 | Example 39 | 51.3 | — | 38.3 | — | 9.4 | 0.001 | 1 |
| Example 34 | Example 40 | 51.3 | — | 38.3 | — | 9.4 | 0.001 | 1 |
| Example 35 | Example 41 | 51.3 | — | 38.3 | — | 9.4 | 0.001 | 1 |
| Example 36 | Example 42 | 51.3 | — | 38.3 | — | 9.4 | 0.001 | 1 |
| Example 37 | Example 43 | — | 54.7 | 17.6 | 17.2 | 9.4 | 0.001 | 1.1 |
| Example 38 | Example 44 | — | 54.7 | 17.6 | 17.2 | 9.4 | 0.001 | 1.1 |

| Adhesive | Isocyanate Group/Thiol Group (molar ratio) | Component (C)/Thiol Group (molar ratio) | Concentration of Thiol Functional Group (mmol/g) | Concentration of NCO Functional Group (mmol/g) | Generator Concentration (mmol/g) |
|---|---|---|---|---|---|
| Example 1 | 0.5 | 0.1 | 4.20 | 2.10 | 0.43 |
| Example 33 | 0.5 | 0.1 | 4.20 | 2.10 | 0.43 |
| Example 34 | 0.5 | 0.1 | 4.20 | 2.10 | 0.43 |
| Example 35 | 0.5 | 0.1 | 4.20 | 2.10 | 0.43 |
| Example 36 | 0.5 | 0.1 | 4.20 | 2.10 | 0.43 |
| Example 37 | 0.37 | 0.1 | 4.19 | 1.55 | 0.43 |
| Example 38 | 0.37 | 0.1 | 4.19 | 1.55 | 0.43 |

TABLE 7

| Type of Rubber | Adhesive | | | | Adhesive Sheet | | | |
|---|---|---|---|---|---|---|---|---|
| | | Curing Time | Adhesion Force (N/25 mm) | Remarks | | Curing Time | Adhesion Force (N/25 mm) | Remarks |
| NR/BR and NR/BR | Example 1 | — | 833 | — | Example 11 | A | 929 | — |
| NR/SBR and NR/SBR | Example 33 | — | 477 | — | Example 39 | A | 529 | — |
| SBR and SBR | Example 34 | — | 280 | — | Example 40 | A | 731 | — |
| NR/SBR/BR and NR/SBR/BR | Example 35 | — | 386 | — | Example 41 | A | 906 | — |
| NR/IR and NR/IR | Example 36 | — | 459 | — | Example 42 | A | 412 | — |
| NR and Steel Plate | Example 37 | — | 171 | — | Example 43 | A | 328 | — |
| NR and NR | Example 38 | — | 139 | — | Example 44 | A | 153 | — |

TABLE 8

| Adhesive | Adhesive Sheet | Formulation | | | | |
|---|---|---|---|---|---|---|
| | | Component (A) PEMP (part by mass) | Component (B) Table 9 (part by mass) | Component (C) Perbutyl O (part by mass) | Component (D) TEDA (part by mass) | Component (E) BYK-307 (part by mass) |
| Example 1 | Example 11 | 51.3 | 38.3 | 9.4 | 0.001 | 1 |
| Example 45 | Example 55 | 51.4 | 38.1 | 9.4 | 0.001 | 1 |
| Example 46 | Example 56 | 37.8 | 54.6 | 6.9 | 0.001 | 0.8 |
| Example 47 | Example 57 | 37.9 | 54.4 | 6.9 | 0.001 | 0.8 |
| Example 48 | Example 58 | 40.1 | 51.8 | 7.3 | 0.001 | 0.8 |
| Example 49 | Example 59 | 28.6 | 65.6 | 5.2 | 0.001 | 0.6 |
| Example 50 | Example 60 | 37.1 | 55.4 | 6.8 | 0.001 | 0.7 |
| Example 51 | Example 61 | 36.2 | 56.5 | 6.6 | 0.001 | 0.7 |
| Example 52 | Example 62 | 40.4 | 51.4 | 7.4 | 0.001 | 0.8 |
| Example 53 | Example 63 | 60.4 | 27.4 | 11.0 | 0.001 | 1.2 |
| Example 54 | Example 64 | 64.7 | 22.6 | 11.5 | 0.001 | 1.3 |

| Adhesive | Isocyanate Group/Thiol Group (molar ratio) | Component (C)/Thiol Group (molar ratio) | Concentration of Thiol Functional Group (mmol/g) | Concentration of NCO Functional Group (mmol/g) | Generator Concentration (mmol/g) |
|---|---|---|---|---|---|
| Example 1 | 0.5 | 0.1 | 4.20 | 2.10 | 0.43 |
| Example 45 | 0.5 | 0.1 | 4.21 | 2.10 | 0.43 |
| Example 46 | 0.5 | 0.1 | 3.09 | 1.55 | 0.32 |
| Example 47 | 0.5 | 0.1 | 3.11 | 1.55 | 0.32 |
| Example 48 | 0.5 | 0.1 | 3.28 | 1.64 | 0.34 |
| Example 49 | 0.5 | 0.1 | 2.34 | 1.17 | 0.24 |
| Example 50 | 0.5 | 0.1 | 3.03 | 1.52 | 0.34 |
| Example 51 | 0.5 | 0.1 | 3.30 | 1.65 | 0.34 |
| Example 52 | 0.5 | 0.1 | 4.16 | 1.54 | 0.43 |
| Example 53 | 0.5 | 0.1 | 4.96 | 2.47 | 0.51 |
| Example 54 | 0.5 | 0.1 | 5.29 | 2.65 | 0.53 |

TABLE 9

| | Adhesive | | | | Adhesive Sheet | | |
|---|---|---|---|---|---|---|---|
| Component (B) | | Curing Time | Adhesion Force (N/25 mm) | Remarks | | Curing Time | Adhesion Force (N/25 mm) | Remarks |
| N3200 | Example 1 | — | 883 | — | Example 11 | A | 929 | — |
| HXLV | Example 45 | — | 207 | — | Example 55 | A | 552 | — |
| Z4470BA | Example 46 | — | 305 | — | Example 56 | A | 826 | — |
| XP2565 | Example 47 | — | 403 | — | Example 57 | A | 669 | — |
| L75(C) | Example 48 | — | 123 | — | Example 58 | A | 442 | — |
| D-204 | Example 49 | — | 151 | — | Example 59 | A | 210 | — |
| D-110N | Example 50 | — | 163 | — | Example 60 | A | 344 | — |
| D-120N | Example 51 | — | 143 | — | Example 61 | A | 379 | — |
| D-127N | Example 52 | — | 286 | — | Example 62 | A | 633 | — |
| IPDI | Example 53 | — | 450 | — | Example 63 | A | 525 | — |
| HDI | Example 54 | — | 148 | — | Example 64 | A | 154 | — |

[Evaluation]

As shown in Table 2 to Table 9, with respect to each of Examples 1 to 64, the adhesive composition contained the components (A) to (C), in which a polythiol compound having a thiol group binding to a primary carbon atom was used as the component (A), and therefore, the curing time of the composition as an adhesive was short and the adhesion force thereof was high.

On the other hand, in each of Comparative Examples 1 to 12, a polythiol group having a thiol group binding to a secondary carbon atom was used or a polythiol compound or an isocyanate group-containing compound was not used, and therefore in these, the curing time was relatively long and the adhesion force was low.

In each of Comparative Examples 13 and 14, the radical generator (C) was not blended, and therefore, the adhesion force was low.

INDUSTRIAL APPLICABILITY

The composition, the adhesive and the adhesive sheet of the present invention can be utilized for adhesion to rubber, especially to vulcanized rubber.

The invention claimed is:
1. A laminate comprising two or more layers bonded to each other, wherein:
at least one layer is a nontransparent rubber layer, and
the at least one rubber layer is adhered to the adjacent layer via an adhesive, wherein the adjacent layer is a nontransparent rubber layer, or a metal layer, wherein the adhesive comprises a composition obtained by blending a polythiol compound (A), an isocyanate group-containing compound (B) and a radical generator (C), wherein:

the polythiol compound (A) is at least one compound selected from an aliphatic polythiol and an aromatic polythiol each of which has a thiol group binding to a primary carbon atom and may contain a hetero atom, wherein:

the radical generator (C) is a thermal radical generator, and the total content of the polythiol compound (A), the isocyanate group containing compound (B) and the radical generator (C) is 80% by mass or more, wherein the ratio of the total molar number of the isocyanate group contained in the isocyanate-containing compound (B) to the total molar number of the thiol group contained in the polythiol compound (A) (isocyanate group/thiol group) is from 0.2 to 0.78.

2. The laminate according to claim 1, wherein the total content of the polythiol compound (A), the isocyanate group containing compound (B) and the radical generator (C) is 90% by mass or more.

3. The laminate according to claim 1, wherein the adhesive is an adhesive sheet.

4. The laminate according to claim 1, wherein the polythiol compound (A) is an aliphatic polythiol.

5. The laminate according to claim 4, wherein the aliphatic polythiol is an acyclic aliphatic compound optionally containing a hetero atom.

6. The laminate according to claim 4, wherein the aliphatic polythiol is a compound having an isocyanurate ring structure.

7. The laminate according to claim 5, wherein the aliphatic polythiol is at least one compound selected from a (tetrafunctional) compound having four said thiol groups in the molecule and a (hexafunctional) compound having six said thiol groups in the molecule.

8. The laminate according to claim 6, wherein the aliphatic polythiol is a (trifunctional) compound having three said thiol groups in the molecule.

9. The laminate according to claim 1, wherein the ratio of the total molar number of the radical generator (C) to the total molar number of the thiol group contained in the polythiol compound (A) (radical generator (C)/thiol group) is 0.025 or more.

10. The laminate according to claim 1, wherein the ratio of the total molar number of the isocyanate group contained in the isocyanate-containing compound (B) to the total molar number of the thiol group contained in the polythiol compound (A) (isocyanate group/thiol group) is from 0.3 to 0.7.

11. The laminate according to claim 1, wherein the ratio of the total molar number of the isocyanate group contained in the isocyanate-containing compound (B) to the total molar number of the thiol group contained in the polythiol compound (A) (isocyanate group/thiol group) is from 0.3 to 0.6.

* * * * *